United States Patent Office 3,310,414
Patented Mar. 21, 1967

3,310,414
BASIC REFRACTORY
Allen M. Alper, Corning, and Robert N. McNally, Horseheads, N.Y., assignors to Corhart Refractories Company, Louisville, Ky., a corporation of Delaware
No Drawing. Filed Feb. 8, 1965, Ser. No. 431,168
5 Claims. (Cl. 106—58)

This invention relates to a novel fused basic refractory material and particularly such refractory material that is especially suitable for use in basic oxygen steelmaking vessels. As is well known, fused refractory is the type of refractory material which is commonly produced by melting a mass of refractory material of the desired composition and then cooling the molten refractory material to form a solidified refractory mass. The molten refractory material may be cast and solidified in a mold to form bodies of particular shapes, or the molten refractory can be solidified within the same container in which it was melted (i.e. solidified in situ). Such solidified monolithic bodies or products are commonly denoted as "fused cast refractory." Additionally, the novel fused basic refractory material can be made in the form of small granules or grain by well known techniques of disintegrating the molten refractory into small globules or particles that are then solidified, or by crushing larger solidified monolithic masses of the refractory.

The environmnet in basic oxygen steelmaking vessels presents a rather severe corrosion and erosion problem for the working linings of the vessels, particularly for the side wall linings. The more detrimental factors of such environment contributing to this problem are: the high temperatures developed by the oxygen blast, the violent action of the steel-forming contents in washing and abrading against the working linings, the corrosive nature of the high lime-to-silica ratio ferruginous slags and slag vapors, and the reducing nature of the carbon monoxide atmosphere developed. Refractories that have been commercially utilized for working linings heretofore in these furnaces have been mainly those of burnt or tar bonded dolomites and magnesites or mixtures thereof, or of fused mixtures of magnesites and chrome ores. Although these refractories exhibit a relatively modest corrosion-erosion resistance in basic oxygen vessel environments, there has been a great desire upon the part of the operators of these vessels for a refractory material having a greatly improved corrosion-erosion resistance in order to increase the life of the working linings, which life has commonly been relatively short with the prior commercial rerfactory materials.

We have now discovered a novel basic fused refractory material that possesses a corrosion-erosion resistance in basic oxygen vessel environments greatly superior to that of the common commercial refractory materials used heretofore. Accordingly, it is an object of this invention to provide such novel and improved basic fused refractory material. It is another object of this invention to provide a novel and improved basic fused refractory material capable of longer service life as a basic oxygen vessel working lining than has been attainable with the common commercial refractory materials used heretofore. Other objects and advantages of the present invention will become aparent from the detailed description below.

Our novel basic fused refractory material is essentially characterized by a composition of, analytically in percent by weight, 60 to 95% MgO and 5 to 40% $MnO_2$. However, for some uses, the $MnO_2$ content can be as low as 1% with a corresponding MgO content as high as 99% where greater difficulty and expense in manufacturing and substantially lower hot strength (based on modulus of rupture in flexure at elevated temperatures) is not objectionable. Although the composition can be composed wholly of the two oxide constituents as described above, the composition may beneficially include limited amounts of other oxides (as diluents, impurities or additives) forming a total remainder content of not more than 35% of oxide selected from one or more of the following three groups of oxides. The first group consists of FeO, CaO, $Cr_2O_3$ and mixtures thereof in a total amount of up to 30%. The second group consists of $TiO_2$, $ZrO_2$ and mixtures thereof in a total amount being less than 20%. The third group consists of BaO, SrO, $Al_2O_3$, $B_2O_3$, $SiO_2$, $P_2O_5$, rare earth oxide and mixtures thereof in a desired total amount being less than 3% to assure good hot strength, although the latter total amount can be somewhat higher but less than 10% where lower hot strength is not objectionable in basic oxygen furnace service or in other applications, such as checkers for glass or metallurgical furnaces. The permissable inclusion of the limited amounts of other oxides permits the use of cheaper, less pure raw materials and contributes to greater ease of melting without destroying the properties making the objects of this invention possible. Furthermore, some of these added constituents provide additional special benefits as will be more fully described below.

A particularly desirable composition of the basic fused refractory material according to this invention consists of 70 to 95% MgO, 5 to 25% $MnO_2$, and a remainder of other oxide totalling not more than 25% selected from one or more of the following groups: (1) up to 20% (and desirably at least 1%) of FeO, CaO, $Cr_2O_3$ and mixtures thereof, (2) less than 15% (but desirably at least 1%) of $TiO_2$, $ZrO_2$ and mixtures thereof, (3) less than 3% of BaO, SrO, $Al_2O_3$, $B_2O_3$, $SiO_2$, $P_2O_5$, rare earth oxide and mixtures thereof.

This refractory material is essentially or substantially a monophase, or single phase, crystalline structure of the periclase type of lattice with manganese in solid solution therein and can be represented by the formula:

$$(Mg,Mn)O$$

Sometimes a minor amount (usually less than 5% by weight) of a spinel phase is formed by the oxides of magnesium and manganese, which is believed to be $MgO \cdot Mn_2O_3$ or $(Mg,Mn)O \cdot Mn_2O_3$. Of course, when the noted additional constituents other than MgO and $MnO_2$ are included, these also may provide a minor amount of spinel and/or other crystalline phase, although such additional constituents may also be largely in solid solution in the periclase lattice. The crystals interlock as is typical of fused type refractory material. There are no substantial amounts of lower-melting, intergranular, eutectic phases that allow the material to be rapidly corroded or penetrated by slag or slag vapors.

This superior corrosion-erosion resistant basic fused refractory material is readily manufacturable into substantially crack-free bodies by melting a mixture of suitable raw materials, for example, calcined magnesite and manganese oxide ore. As will be appreciated, relatively high temperatures (e.g. approx. 2000–2800° C.) are required to fuse and completely melt the compositions of this invention. Preferably, conventional electric arc melting furnaces utilizing graphite electrodes are employed, although any other suitable means can be used as desired. The raw batch materials are suitably proportioned to provide the desired final composition and, preferably, are premixed in granulated form prior to charging into the melting furnace.

The more usual form of our novel refractory for lining basic oxygen vessels is that of bricks cast to shape, or cut from billets that are cast, by pouring the molten batch material into conventional preformed molds of any suitable material, e.g. graphite, bonded sand, or steel, and allowing it to cool and solidify according to conventional practice, for example, as disclosed in United States Patent 1,615,750 to G. S. Fulcher, to which reference may be had. If desired, the novel refractory material can be melted and solidified in the same container. However, if desired, a stream of the molten refractory can be disintegrated by known conventional techniques into small globules or particles of desired size and solidified as a mass of fused granular material. This granular material, with or without other additional refractory material, can then be used to form rebonded bricks of special shape that are not as easily formed by directly casting the shape from the molten material. Moreover, the granular material for making rebonded bricks can be obtained by crushing blocks, billets or boules of the novel refractory material.

As previously noted, our novel fused refractory may consist solely of the oxides of magnesium and manganese in the ranges specified above. However, it is preferred to use less pure, less expensive commercial raw materials that may additionally provide one or more of the other specified oxides (e.g. FeO, CaO, $Al_2O_3$, $SiO_2$, etc.) within the limits specified above. These limited amounts of additional oxides do not deleteriously affect the essential characteristics of our novel refractory and, in some cases, they enhance these characteristics or provide additional special benefits. For example, $Al_2O_3$, $B_2O_3$, $SiO_2$ and/or $P_2O_5$ tend to increase hydration resistance and facilitate melting, $Cr_2O_3$ and $ZrO_2$ tend to increase resistance to hot siliceous slags and vapors, and $TiO_2$ tends to increase hot strength.

Particularly good properties and results for basic oxygen vessel service were noted for four more specific preferred composition areas. The first area consists of 70 to 95% MgO, 5 to 25% $MnO_2$, less than 5% FeO, less than 2% CaO, less than 2% $SiO_2$, less than 2% $Al_2O_3$, less than 0.5% $P_2O_5$ and the sum of $SiO_2+Al_2O_3+P_2O_5$ being less than 3%. The second area consists of 65 to 90% MgO, 5 to 20% $MnO_2$, 5 to 20% FeO, less than 2% CaO, less than 2% $SiO_2$, less than 1% $Al_2O_3$, less than 0.5% $P_2O_5$ and the sum of $SiO_2+Al_2O_3+P_2O_5$ being less than 3%. The third area consists of 65 to 90% MgO, 5 to 20% $MnO_2$, not more than 20% of FeO+CaO, the CaO being at least 5% and the FeO being less than 5%, less than 2% $SiO_2$, less than 1% $Al_2O_3$, less than 0.5% $P_2O_5$ and the sum of $SiO_2+Al_2O_3+P_2O_5$ being less than 3%. The fourth area consists of 70 to 95% MgO, 3 to 20% $MnO_2$, 2 up to but less than 15% $TiO_2$, less than 5% FeO+CaO, the CaO being less than 2%, less than 2% $SiO_2$, less than 1% $Al_2O_3$, less than 0.5% $P_2O_5$ and the sum of $SiO_2+Al_2O_3+P_2O_5$ being less than 3%. The first, second and fourth areas appear to provide better corrosion-erosion resistance than the third area.

By way of illustrating and providing a better appreciation of the present invention, the following detailed description and data are given concerning refractory samples, of the invention and of prior materials, and their properties or characteristics.

Table I shows batch mixtures (in percent by weight) that were electric arc melted and the chemical compositions of the solidified blocks as calculated from the analyses of the oxides entering into the batch mixtures. All the examples in Table I are of fused refractory material of this invention.

The various constituents in the batch mixtures of Table I were provided by common commercially available raw materials whose typical chemical analyses, in weight percent, were as follows:

*Calcined magnesite.* — 98.51% MgO, 0.86% CaO, 0.28% $SiO_2$, 0.22% $Fe_2O_3$, 0.13% ignition loss.

*$MnO_2$ Concentrate.* — 79+% $MnO_2$, 5.25% $Al_2O_3$, 2.75% Fe, 1.85% $SiO_2$.

*$MnO_2$ Ore.* — 62.0% $MnO_2$, 18.0% $Fe_2O_3$, 7.05% $SiO_2$, 3.03% $Al_2O_3$, 0.55% $P_2O_5$.

*Magnetite.* — 98.5+% $Fe_3O_4$, 0.77% $SiO_2$, 0.24% $Al_2O_3$, 0.20% $TiO_2$, 0.08% MgO, 0.02% Mn.

TABLE I

| Example No | 1 | 2 | 3 | 4 | 5 | 6 | 7 | 8 | 9 | 10 | 11 |
|---|---|---|---|---|---|---|---|---|---|---|---|
| Calcined Magnesite, percent | 95 | 95 | 85 | 85 | 75 | 70 | 80 | 80 | 70 | 70 | 80 |
| $MnO_2$ Concentrate, percent | 5 | | 15 | | 25 | | | | | | |
| $MnO_2$ Ore, percent | | 5 | | 15 | | 30 | 10 | 15 | 15 | 15 | 10 |
| Magnetite, percent | | | | | | | 10 | 5 | 15 | | |
| Calcined Lime, percent | | | | | | | | | | 15 | |
| Rutile, percent | | | | | | | | | | | 10 |
| MgO, percent | 93.7 | 93.7 | 83.8 | 83.8 | 74.0 | 69.1 | 78.9 | 78.9 | 69.1 | 69.2 | 78.9 |
| $MnO_2$, percent | 4.4 | 3.4 | 13.3 | 10.3 | 22.2 | 20.5 | 6.8 | 10.3 | 10.3 | 10.3 | 6.8 |
| FeO, percent | 0.4 | 1.2 | 0.7 | 3.2 | 0.9 | 6.1 | 12.0 | 8.1 | 17.9 | 3.1 | 2.3 |
| CaO, percent | 0.8 | 0.8 | 0.7 | 0.7 | 0.7 | 0.6 | 0.7 | 0.7 | 0.6 | 15.1 | 0.7 |
| $SiO_2$, percent | 0.4 | 0.7 | 0.6 | 1.4 | 0.7 | 2.5 | 1.1 | 1.4 | 1.5 | 1.6 | 1.0 |
| $Al_2O_3$, percent | 0.3 | 0.2 | 0.9 | 0.5 | 1.5 | 1.0 | 0.4 | 0.5 | 0.5 | 0.6 | 0.4 |
| $P_2O_5$, percent | | | | 0.1 | | 0.2 | 0.1 | 0.1 | 0.1 | 0.1 | 0.1 |
| $TiO_2$, percent | | | | | | | | | | | 9.8 |
| Percent Slag Cut | | 21 | | 17 | | 26 | 19 | 21 | 23 | 34 | 14 |
| Avg. Modulus of Rupture at 1,340° C. (p.s.i.) | 330 | 130 | 1,345 | 1,780 | 1,330 | 1,209 | 720 | 2,020 | 2,450 | | 2,250 |

*Calcined lime.*—95.65% CaO, 1.30% $SiO_2$, 0.85% MgO, 0.85% $R_2O_3$, 0.04% S, 0.85% ignition loss.

*Rutile.*—96–98% $TiO_2$, 1% max. $Fe_2O_3$, 0.3% $ZrO_2$, 0.3% $Al_2O_3$, 0.25% $SiO_2$, 0.1% $Cr_2O_3$, 0.29% $V_2O_5$, 0.025–0.05% $P_2O_5$, 0.01% S.

The present slag cut data shows the resistance to high lime-to-silica ratio ferruginous slag by the various samples and is based upon the test comprising placing 1½" x 1" x ½" samples in a furnace having a CO atmosphere adapted to approximate a basic oxygen vessel environment. At 1700° C. for about 2½ to 3 hours, the samples were passed, with one of their largest surfaces facing upward, through a downwardly directed stream of molten basic slag droplets at a substantially uniform rate of 60 times per hour until 2 kilograms of slag had been employed. The slag was representative of basic oxygen furnace slag developed during the production of a heat of steel and had the following composition, by weight: 23.75% $Fe_2O_3$, 25.94% $SiO_2$, 40.86% CaO, 6.25% MgO and 3.20% $Al_2O_3$. At the end of the test, the average thickness of the samples was measured and compared with the original ½" thickness prior to testing. The results are expressed as a percentage change in thickness (called percent slag cut).

In contrast to the present invention, two samples of more conventional tar bonded dolomite brick both exhibited a slag cut of 100% (i.e. these samples were completely cut in half) in the same test. Samples of common commercial basic fused refractory made from a mixture of essentially 55% by weight magnesite and 45% by weight Transvaal chrome ore (representative of the material according to U.S. Patent 2,599,566) exhibited slag cuts of 40–100% in the same test.

While the hereindescribed novel basic fused refractory material is especially suitable for basic oxygen vessel linings, it will be apparent that this material can be employed in other forms, structures and uses as desired or deemed suitable without departing from the scope of this invention.

As used in this specification, (1) all the percentage quantities of the specified oxides are expressed analytically in percent by weight, and they include all of the respective metal or metalloid contents as analyzed and then calculated in terms of the specified oxides, although some of the metals and/or metalloids may not exist in the material in the precise form or oxidation state of such oxides (for example, some iron oxide may exist as $Fe_2O_3$ or $Fe_3O_4$ although much of it is usually present as FeO due to the reducing nature of the melting environment employed), and (2) rare earth oxide means the common oxide of one or more of yttrium and the lanthanide series elements having an atomic number of 57 to 71.

We claim:

1. A fused refractory material having interlocking crystals and consisting of, analytically by weight, 65 to 90% MgO, 5 to 20% $MnO_2$, 5 to 20% FeO, less than 2% CaO, less than 2% $SiO_2$, less than 1% $Al_2O_3$, less than 0.5% $P_2O_5$ and the sum of $SiO_2+Al_2O_3+P_2O_5$ being less than 3%.

2. A fused refractory material having interlocking crystals and consisting of, analytically by weight, 70 to 95% MgO, 3 to 20% $MnO_2$, 2 up to but less than 15% $TiO_2$, less than 5% FeO+CaO, the CaO being less than 2%, less than 2% $SiO_2$, less than 1% $Al_2O_3$, less than 0.5% $P_2O_5$ and the sum of $SiO_2+Al_2O_3+P_2O_5$ being less than 3%.

3. A fused cast refractory having interlocking crystals and consisting of approximately, analytically by weight, 79% MgO, 10% $MnO_2$, 8% FeO, 0.7% CaO, and the balance $SiO_2+Al_2O_3+P_2O_5$.

4. A fused cast refractory having interlocking crystals and consisting of approximately, analytically by weight, 69% MgO, 10% $MnO_2$, 18% FeO, 0.6% CaO and the balance $SiO_2+Al_2O_3+P_2O_5$.

5. A fused cast refractory having interlocking crystals and consisting of approximately, analytically by weight, 79% MgO, 7% $MnO_2$, 10% $TiO_2$, 3% FeO+CaO and the balance $SiO_2+Al_2O_3+P_2O_5$.

References Cited by the Examiner

UNITED STATES PATENTS 2,113,818   4/1938   Sullivan _____ 106—60

OTHER REFERENCES

Riboud et al.: Melting Relations of CaO-Manganese Oxide and MgO-Manganese Oxide Mixtures in Air, J. American Ceramic Society, volume 46, No. 1, 1963, pages 33–36.

TOBIAS E. LEVOW, *Primary Examiner.*

J. E. POER, *Assistant Examiner.*